May 12, 1936.  C. S. BAKER  2,040,542
VALVE ASSEMBLY
Filed July 20, 1933
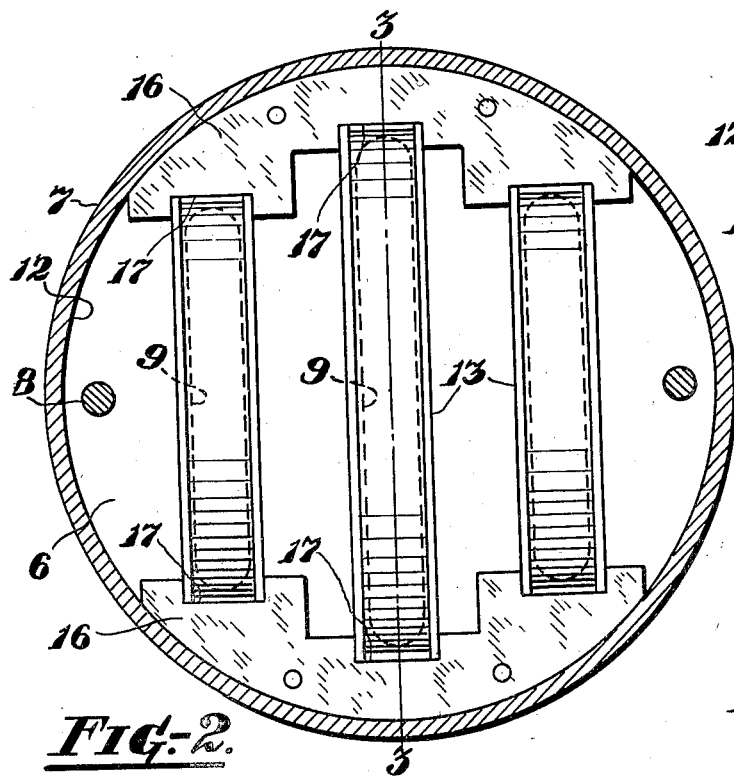
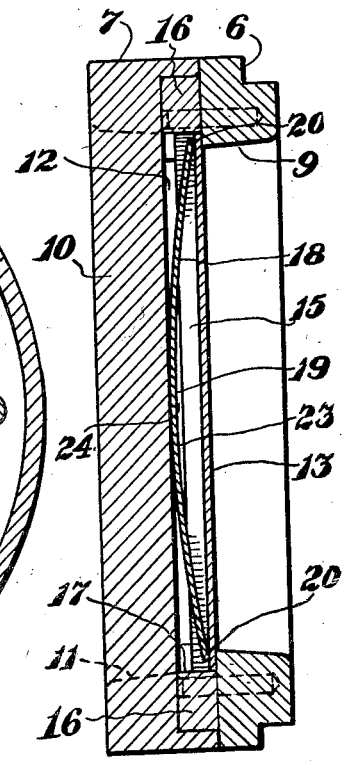
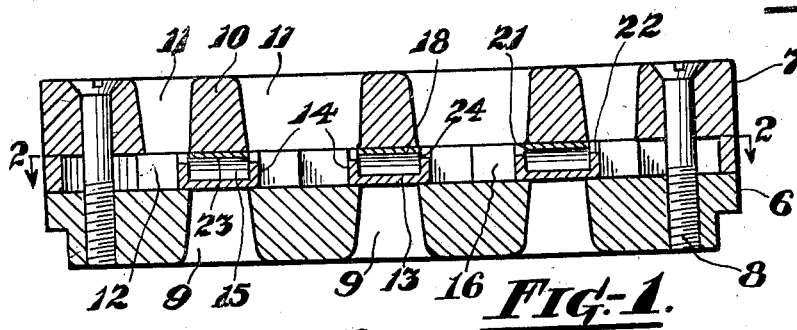
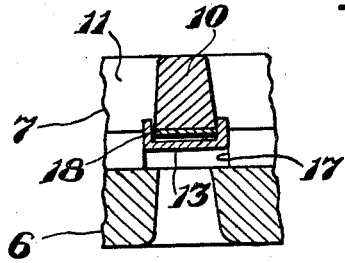
INVENTOR.
Charles S. Baker
BY
HIS ATTORNEY.

Patented May 12, 1936

2,040,542

UNITED STATES PATENT OFFICE 2,040,542

VALVE ASSEMBLY

Charles S. Baker, Corning, N. Y., assignor to Ingersoll-Rand Company, Jersey City, N. J., a corporation of New Jersey Application July 20, 1933, Serial No. 681,269

6 Claims. (Cl. 251—144)

This invention relates to valves, and more particularly to valves adapted to control the admission of fluid to or the discharge of fluid from a compressor, depending upon whether the valve serves as an inlet or a discharge valve.

One object of the invention is to effectively cushion the movement of the valve, thereby preventing sharp and damaging impact of the valve against the elements serving as stops therefor.

Another object is to confine the wear, incident to operation, to only the relatively inexpensive elements of the valve assembly.

Other objects will be in part obvious and in part pointed out hereinafter.

In the drawing accompanying this specification and in whch similar reference numerals refer to similar parts, Figure 1 is a sectional elevation of a valve assembly constructed in accordance with the practice of the invention showing the valve or valves in the port-sealing position, Figure 2 is a transverse view taken through Figure 1 on the line 2—2 looking in direction indicated by the arrows, Figure 3 is a transverse view taken on the line 3—3 of Figure 2 illustrating the manner in which the valve spring defines an inlet opening for the cushioning chamber in the valve, and Figure 4 is a view similar to Figure 1 showing the valve in the raised or open position.

Referring more particularly to the drawing, the valve assembly, illustrated as a discharge valve, comprises a valve seat 6 and a stop plate 7 which is seated upon the end of the valve seat and secured thereto as by screws 8 extending through the stop plate and being threaded into the valve seat.

In the valve seat 6 are a plurality of ports 9 through which fluid may flow into or from the compressing apparatus to which the valve mechanism may be applied. The ports 9 are preferably arranged in parallelism, and in the same longitudinal planes as the ports are ribs 10 which may be integral portions of the stop plate 7 and define spaces 11 through which fluid passes to and from the ports 9.

In the end of the stop plate 7, adjacent the valve seat 6, is a recess 12 wherein are arranged valves 13 to control the ports 9. The valves 13 are in the form of straight narrow plates having lateral flanges 14 extending along their longitudinal edges and lying on the same side of the valves, in this instance extending toward the stop plate 7, to form cushioning chambers 15 in the valves 13. The width of the cushioning chambers 15 is preferably somewhat greater than that of the ribs 10 in order to avoid contact between the valves and the ribs during the reciprocatory movement of the valves.

Any suitable means may be provided for guiding the valves 13, as for instance, guide plates 16 arranged at the ends of the ports 9 and having notches or recesses 17 into which the ends of the valves 13 extend slidably.

In order to effect a prompt seating of the valve plates 13 and to hold said valves in fluid tight relationship with the valve seat 6 springs 18 are disposed in the cushioning chambers 15 to act against the valves 13 and the ribs 10. The springs employed for this purpose are of the curved leaf type and are so arranged that the bowed intermediate portions 19 thereof seat against the ribs 10 and the ends or tips 20 of the springs seat against the valves 13.

As an additional function the springs 18 also serve to control the flow of cushioning fluid into and from the cushioning chambers 15. The springs are accordingly of only slightly less width than the cushioning chambers so that during the lifting or opening movement of the valves the cushioning fluid, as for instance compressed air, will be gradually expelled from the cushioning chambers through the clearance or spaces existing between the inner surfaces of the flanges 14 and the sides or edges 21 of the springs 18.

In order to permit the free flow of cushioning fluid into the cushioning chambers 15 the flanges 14 are of such height that when the valves occupy their closed positions, that is, when they are seated upon the valve seats 6 and during the initial lifting or opening movement of the valves, the edges 22 of the free ends of the flanges 14 will be below the inner surface 23 of the springs 18. Owing to this arrangement inlet openings 24 will be defined by the edges 22 and the springs through which the cushioning fluid may enter the chambers 15.

During the operation of a compressor to which the valve assembly may be applied the compressed fluid flowing through the ports 9 lifts the valves 13, thence passes through the recess 12 and the spaces 11 to storage or to the apparatus which it motivates. After the valves are partly opened the flanges 14 move into the plane of the sides or edges 21 of the springs 18 and thus cut off further communication between the source of cushioning medium and the chambers 15. During the remainder of the opening movement of the valves the cushioning medium is gradually expelled from the cushioning chambers through the restricted spaces between the edges 21 of the springs and the inner surfaces of the flanges 14, thus preventing the valves from rising abruptly and striking violently against the stop plate 7. At the end of the discharge stroke of the compressing apparatus the springs 18 will actuate the valves 13 towards the seat 6 and seal the ports 9.

By providing a suitable degree of clearance between the flanges 14 and the springs 18 the return movement of the valves may be retarded somewhat. In other words, a negative pressure may be caused to exist in the cushioning chambers 15 and the initial seating movement of the valves 13 will thus take place comparatively slowly. However, when the valves reach a position to again admit cushioning fluid into the cushioning chambers 15 the valves will move quickly against the valve seat.

In practice, the present invention has been found to be a highly efficient device. This is due largely to the fact that the construction shown imposes no limitation on the degree of lift of the valves. Being adequately protected against destructive impact upon the elements which limit their movement the valve plates are also capable of a very high speed of reciprocation as compared with the present known valves.

A further highly desirable feature of the present invention is that owing to the manner in which the valve plates are guided any wear resulting from their movement is confined entirely to the valve plates, the springs 18 and the guide plates 16, rather than to the comparatively expensive parts such as the valve seat and the stop plate.

Although I have shown only a preferred form of the invention I do not wish to be limited to the precise construction illustrated as, obviously, the invention is susceptible of a considerable degree of modification without departing from the spirit of the invention or the scope of the claims.

I claim:

1. A valve assembly comprising a valve seat having a port, a valve to control the port and having a cushioning chamber, a stop member for the valve, and a spring in the form of a bowed plate in the chamber to press the valve against the valve seat and having a portion extending alternately out of and into the cushioning chamber respectively as the valve is in the closed and open positions, said portion cooperating with certain of the surfaces defining the cushioning chamber to control the flow of cushioning fluid into and from the cushioning chamber.

2. A valve assembly comprising a valve seat having a port, a valve to control the port and having a cushioning chamber, a stop member for the valve, means to guide the valve, and a spring in the form of a bowed plate acting against the stop member and the valve to press the valve against the valve seat and having a portion extending alternately out of and into the cushioning chamber respectively as the valve is in the closed and open positions, said portion cooperating with certain of the surfaces defining the cushioning chamber to control the flow of cushioning fluid into and from the cushioning chamber.

3. A valve assembly comprising a valve seat having a port, a valve to control the port and having a cushioning chamber, a stop member for the valve, means for guiding the valve, and a spring in the form of a bowed plate in the chamber acting against the stop member and the valve to press the valve against the valve seat and having a bowed portion extending alternately out of and into the cushioning chamber respectively as the valve is in the closed and open positions, said bowed portion cooperating with certain of the surfaces defining the cushioning chamber to control the flow of cushioning fluid into and from the cushioning chamber.

4. A valve assembly comprising a valve seat having a port, a valve to control the port and having a cushioning chamber, a stop member, and a spring in the form of a bowed plate in the chamber for pressing the valve to the valve seat and having a portion extending out of the cushioning chamber to define an inlet opening for the free passage of cushioning fluid into the cushioning chamber when the valve is in the closed position, said spring cooperating with the sides of the cushioning chamber to restrict the flow of cushioning fluid from the cushioning chamber during the opening movement of the valve.

5. A valve assembly comprising a valve seat having a port, a valve to control the port and having a cushioning chamber, a stop member for the valve, and a bowed plate spring in the cushioning chamber acting against the stop member and the valve to press the valve against the valve seat and to cooperate with the edges of the cushioning chamber in the closed position of the valve to define an inlet opening for the passage of cushioning fluid into the cushioning chamber, the edges of said spring cooperating with the walls of the cushioning chamber to restrict the flow of cushioning fluid from the cushioning chamber during the opening movement of the valve.

6. A valve assembly comprising a valve seat having a port, a stop member, a valve to control the port and having a cushioning chamber, and a spring to press the valve against the valve seat and having a bowed portion to seat against the stop member and portions on opposite sides of the bowed portion to seat against the valve, said spring cooperating with the edges of the walls of the cushioning chamber to define an inlet opening for the admission of cushioning fluid into the chamber and cooperating with the inner surfaces of the cushioning chamber to effect a restricted flow of cushioning fluid from the cushioning chamber.

CHARLES S. BAKER.